(12) United States Patent
Miyanaga

(10) Patent No.: US 7,540,341 B2
(45) Date of Patent: Jun. 2, 2009

(54) DRILL BIT

(75) Inventor: Masaaki Miyanaga, Hyogo (JP)

(73) Assignee: Kabushiki Kaisha Miyanaga, Miki-shi (JP)

( * ) Notice: Subject to any disclaimer, the term of this patent is extended or adjusted under 35 U.S.C. 154(b) by 256 days.

(21) Appl. No.: 10/516,227

(22) PCT Filed: Jun. 6, 2002

(86) PCT No.: PCT/JP02/05581

§ 371 (c)(1),
(2), (4) Date: May 18, 2005

(87) PCT Pub. No.: WO03/103914

PCT Pub. Date: Dec. 18, 2003

(65) Prior Publication Data

US 2005/0205306 A1    Sep. 22, 2005

(51) Int. Cl.
*E21B 10/43* (2006.01)
(52) U.S. Cl. .................. 175/420; 175/419; 175/323
(58) Field of Classification Search ............. 175/323, 175/414, 419, 420, 425, 410, 420.1
See application file for complete search history.

(56) References Cited

U.S. PATENT DOCUMENTS 4,294,319 A * 10/1981 Guergen .................... 175/389
6,868,924 B2 * 3/2005 Haussmann et al. ....... 175/420.1
2002/0108789 A1 * 8/2002 Schautt ..................... 175/420.1
2003/0188895 A1 * 10/2003 Osawa et al. ................. 175/323

FOREIGN PATENT DOCUMENTS

JP    01-204705    8/1989
JP    2001-121529    5/2001

OTHER PUBLICATIONS

Inernational Search Report by the Japanese Patent Office dated Sep. 17, 2002, for International Application No. PCT/JP02/05581.

* cited by examiner

*Primary Examiner*—David J Bagnell
*Assistant Examiner*—Brad Harcourt
(74) *Attorney, Agent, or Firm*—Marshall, Gerstein & Borun LLP

(57) ABSTRACT

A drill bit of the present invention is intended to stably perform drilling by lessening a great change in a drilling condition and to avoid reduction of a drilling efficiency even when large chip lumps are generated. In the drill bit, the main cutting blades have main cutting edges each structured such that an inner end thereof is located at the rotation center of the drill and an outer end thereof is located on an outer periphery of a rotation trace of the cutting blades, and the sub cutting blades have sub cutting edges each structured such that an inner end thereof is located to be spaced radially outward apart from the rotation center and an outer end thereof is located to be spaced radially inward apart from the outer periphery of the rotation trace toward the center of rotation.

2 Claims, 4 Drawing Sheets

DRILL BIT

TECHNICAL FIELD

The present invention relates to a drill bit constructed such that a cutting blade body made of cemented carbide is integrally and fixedly attached to a tip end of a bit body by brazing, welding, or the like. More particularly, the present invention relates to a drill bit that has high drilling efficiency in drilling a hole in concrete, stone, etc.

BACKGROUND ART

Drilling (Boring) a hole in concrete, stone, etc, is done by attaching a dedicated drill bit to a rotating hammer drill and by applying both an axial vibrational striking force and a rotational torque to the drill bit. This type of drill bit is constructed such that a cutting blade body made of wear-resistant cemented carbide is fixedly attached to a tip end of a steel bit body by brazing, welding or the like. In addition, chip discharge grooves are provided on an outer periphery of the bit body so as to correspond to concave portions formed on cutting blades of the cutting blade body. Further, a standardized shank portion is attached to a base end portion of the bit body and configured to be coupled to a drive shaft of the hammer drill.

The applicant disclosed a novel drill bit of this type (Japanese Patent Application No. 2000-377082). This drill bit is constructed such that a plurality of cutting blades extend substantially radially outward from the center of a block-like cutting blade body fixedly attached to a tip end of a bit body. Each cutting blade has a face and a flank. An edge formed at a boundary between the face and the flank of the cutting blade to protrude toward a tip end of the cutting blade body to form a cutting edge. And, inner ends (ends on the center side) of the cutting blades are coupled to form the tip end pointed without a chisel edge. Between adjacent cutting blades, a chip discharge groove is formed by a concave portion recessed backward. The chip discharge groove is continuous with a wide bit chip discharge groove provided on an outer periphery of the bit body.

In accordance with the drill bit constructed as described above, during drilling the hole in the concrete, the stone, etc, cutting (striking and cutting) is performed in such a manner that the cutting blade impactly strikes a cutting face of a drill hole, thereby generating chips. These chips move up from the cutting face of the drill hole according to an axial movement of the drill bit, and moves through each chip discharge groove. Then, the chips are discharged into the wide bit chip discharge groove. As should be appreciated, the chips are smoothly discharged outside the drill hole. Thus, regardless of a depth of the drill hole, the chips are efficiently discharged. Further, since the tip end of the cutting blades is pointed without the chisel edge, the center of rotation is uniquely determined in drilling, thereby allowing the cutting blades to stably rotate. As a consequence, it is possible to easily drill a hole having a desired diameter and a desired shape. In addition, highly durable drill bit is achieved.

However, in the above-constructed drill bit, the cutting blades of the cutting blade body are configured (structured) in the same manner. Because of this, when the cutting blade strikes hard object such as reinforcing steel within concrete or stone during drilling the hole in the concrete or the like, an impact force concentratively acts on the cutting blade that has struck the object or its adjacent cutting blade, thereby causing a great change in a drilling condition.

During drilling, various sizes of large and small chips, including large chip lumps, are generated on the cutting face of the drill hole. Since the large chip lumps are crushed into small chips during repeated striking and cutting, drilling is not impeded by the large chip lumps. However, while the large chip lumps are being struck and crushed by the cutting edge of the drill bit, the cutting edge does not perform a cutting action for the cutting face of the drill hole, that is, the cutting action is interrupted. This reduces drilling efficiency.

DISCLOSURE OF THE INVENTION

An object of the present invention is to provide a drill bit capable of carrying out drilling as stably as possible by lessening a great change in a drilling condition and without reducing drilling efficiency when large chip lumps are generated in drilling a hole in concrete, stone, etc.

In order to achieve the above object, a drill bit of the present invention comprises a plurality of cutting blades, each of which is provided at a tip end of a drill and disposed to extend substantially radially outward from a rotation center side of the drill and has a cutting edge formed by protruding an edge between a face and a flank of each cutting blade toward a tip end of the drill; and a shaft-shaped bit body attached to a base end side of the cutting blades and having a base end portion coupled to a shank portion, the drill bit being configured to perform striking and cutting by a combination of a rotation and an axial movement, wherein the cutting blades include at least two main cutting blades and at least two sub cutting blades each disposed between adjacent main cutting blades in a circumferential direction of the cutting blades, the main cutting blades have main cutting edges each structured such that an inner end thereof is located at the rotation center of the drill bit and an outer end thereof is located on an outer periphery of a rotation trace of the cutting blades, and the sub cutting blades have sub cutting edges each structured such that an inner end thereof is located to be spaced radially outward apart from the rotation center and an outer end thereof is located to be spaced radially inward apart from the outer periphery of the rotation trace toward the center of rotation.

In accordance with the drill bit constructed as described above, in drilling a hole in concrete, stone, etc, cutting of the cutting face of the drill hole (involving crushing of chips on the cutting face of the drill hole) is struck by the main cutting edge extending from the rotation center to the outer end of the cutting blade, and the sub cutting edge assists in the cutting performed by the main cutting edge. In other words, the sub cutting edge assists in striking and cutting performed by the main cutting edge, and they cooperate with each other to carry out efficient cutting. Since the outer end of the sub cutting edge is located closer to the rotation center than the outer end of the main cutting edge, and hence the sub cutting edge does not contact the inner surface of the drill hole, efficient striking and cutting are accomplished by reducing a cutting resistance in the whole drill bit. In addition, since the outer periphery of the main cutting edge is guided by an inner peripheral surface of the drill hole, a hole in a desired shape (circular hole) can be drilled.

In the drill bit, the main cutting edges of the main cutting blades may be each inclined so as to retreat on the outer end side, and the inner ends of the main cutting edges may be coupled to one another at substantially the rotation center to form a tip end of the cutting blades. Thereby, the tip end of the cutting blades conforms to the rotation center, and thus, the cutting blades stably rotate. In addition, striking and cutting are performed effectively in such a manner that the tip end of the cutting blades strikes the cutting face of the drill hole.

In the drill bit, the sub cutting edges of the sub cutting blades may be inclined at an equal angle and in the same direction with respect to the main cutting edges of the main cutting blades. In a manufacturing process, each cutting blade is formed to have the face and the flank by cutting, and the main cutting edge and the sub cutting edge are formed by "sharpening" under the same conditions and easily. Consequently, a drill bit can be manufactured with increased productivity.

In the drill bit, the sub cutting edges may be located to retreat relative to the main cutting edges. In this structure, the main cutting edges in large part carries out the direct striking and cutting of the cutting face of the drill hole, and the sub cutting edges effectively crush large chip lumps generated and sandwiched between the main cutting edges. In other words, during drilling, the large chip lumps generated on the cutting face of the drill hole and the concurrent drilling are carried out effectively by cooperation between adjacent main cutting edge and sub cutting edge. Consequently, a higher drilling efficiency is gained as compared to the conventional drill bit.

In the drill bit, a crush face may be formed between the sub cutting edge and the rotation center to retreat relative to the sub cutting edge. In this structure, the large chip lumps generated by the striking and cutting performed by the main cutting edge or the like are sandwiched between the main cutting blade and the sub cutting blade and effectively crushed between the crush face and the cutting face of the drill hole. Because the large chip lumps are crushed into small chips, the operations of the main cutting edges and the sub cutting edges are not interrupted by the large chip lumps. So, striking and cutting continue effectively. Consequently, high drilling efficiency is gained.

In the drill bit, the crush face may be inclined downward on the flank side of the sub cutting blade. Thereby, since the large chip lumps are crushed into small chips by the cutting face as described above and the small chips are pushed out from the cutting blade into the chip discharge groove by the inclination of the cutting face, the chips can be discharged more efficiently.

In the drill bit, the main cutting blades and the sub cutting blades may be integral with each other to form a block of a cutting blade body, and the cutting blade body may be fixedly attached to a tip end of the bit body. In manufacturing process, the main cutting blades and the sub cutting blades are molded in an integral block shape by sintering and casting, and easily fixedly attached to the tip end of the bit body by welding or the like. Thus, the cutting blade body can be efficiently manufactured.

In the drill bit, the main cutting blade and the sub cutting blade may be alternately disposed in the circumferential direction to extend from the tip end of the cutting blades, and may be substantially asterisk-shaped such that the cutting blades extend from the tip end as seen in a bottom view. This is desirable since the gap between the cutting blades can be utilized as the chip discharge groove. In this case, in the drill bit having an outer diameter of approximately 6 mm to 20 mm, about four to eight cutting blades, including the main cutting blades and the sub cutting blades, are desirably embodied. It is preferable that even-numbered cutting blades are provided such that the main cutting blade and the sub cutting blade are alternately disposed, and odd-numbered cutting blades are provided such that the main cutting blade and the sub cutting blade are alternately disposed and the main cutting blade and the main cutting blade are disposed adjacent each other at one position.

In the drill bit, a concave chip discharge groove may be formed between adjacent cutting blades, and a bit chip discharge groove may be formed on an outer peripheral face of the bit body to extend continuously with the chip discharge groove. Thereby, it is possible to efficiently discharge the chips generated at the cutting face of the drill hole outside the drill hole.

In the drill bit, the cutting blades may be formed of cemented carbide, and the bit body may be formed of steel. Thus, it is possible to provide a drill bit comprised of the cutting blades made of cemented carbide with high cutting ability and high wear-resistance and being capable of exhibiting high performance in a-reduced cost.

BEST MODE FOR CARRYING OUT THE INVENTION

Hereinafter, an example of an embodiment of the present invention will be described with reference to the drawings.

Figure 1:
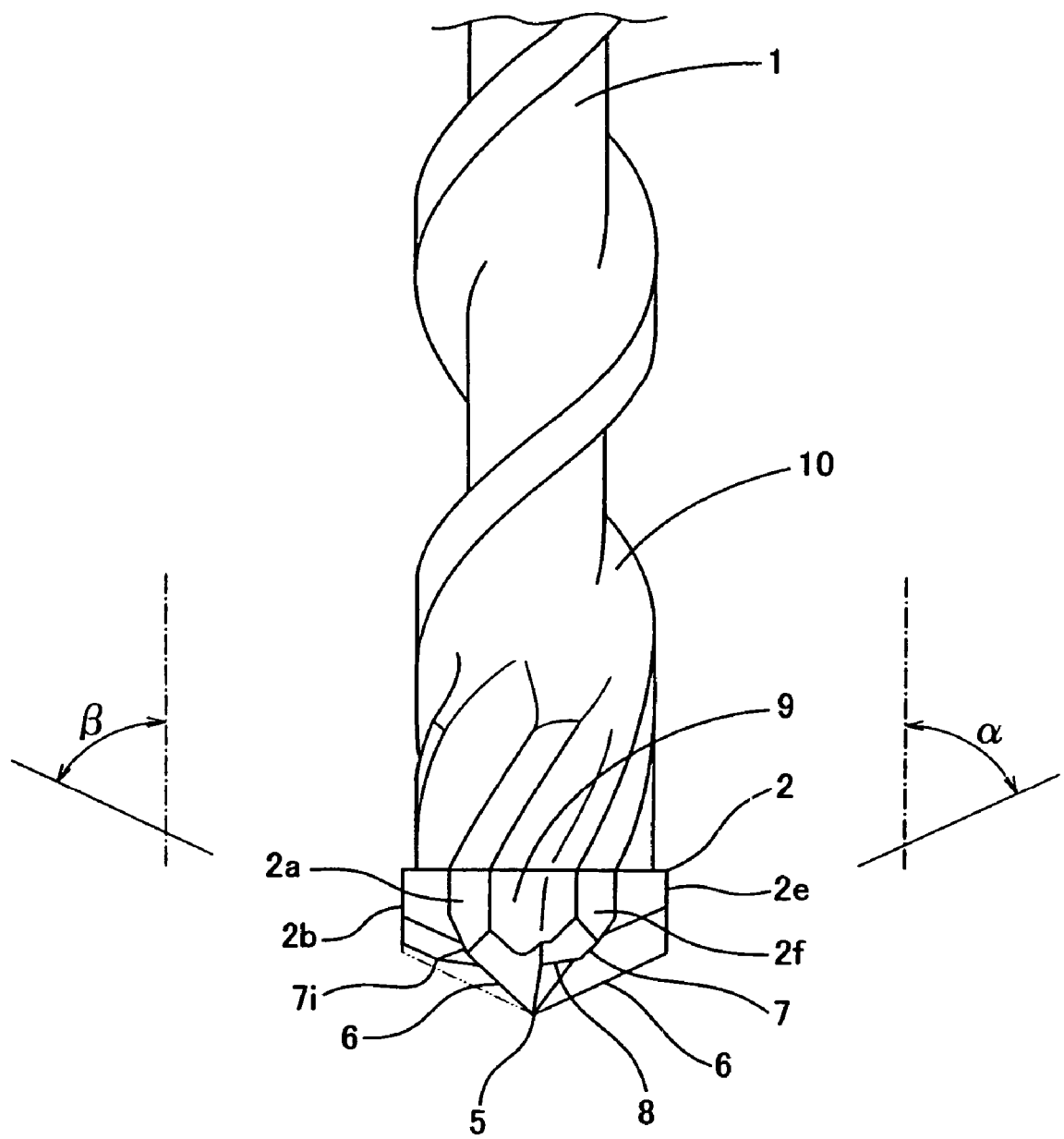
FIG. 1 is a front view showing a construction of a drill bit according to an embodiment of the present invention.
Figure 2:
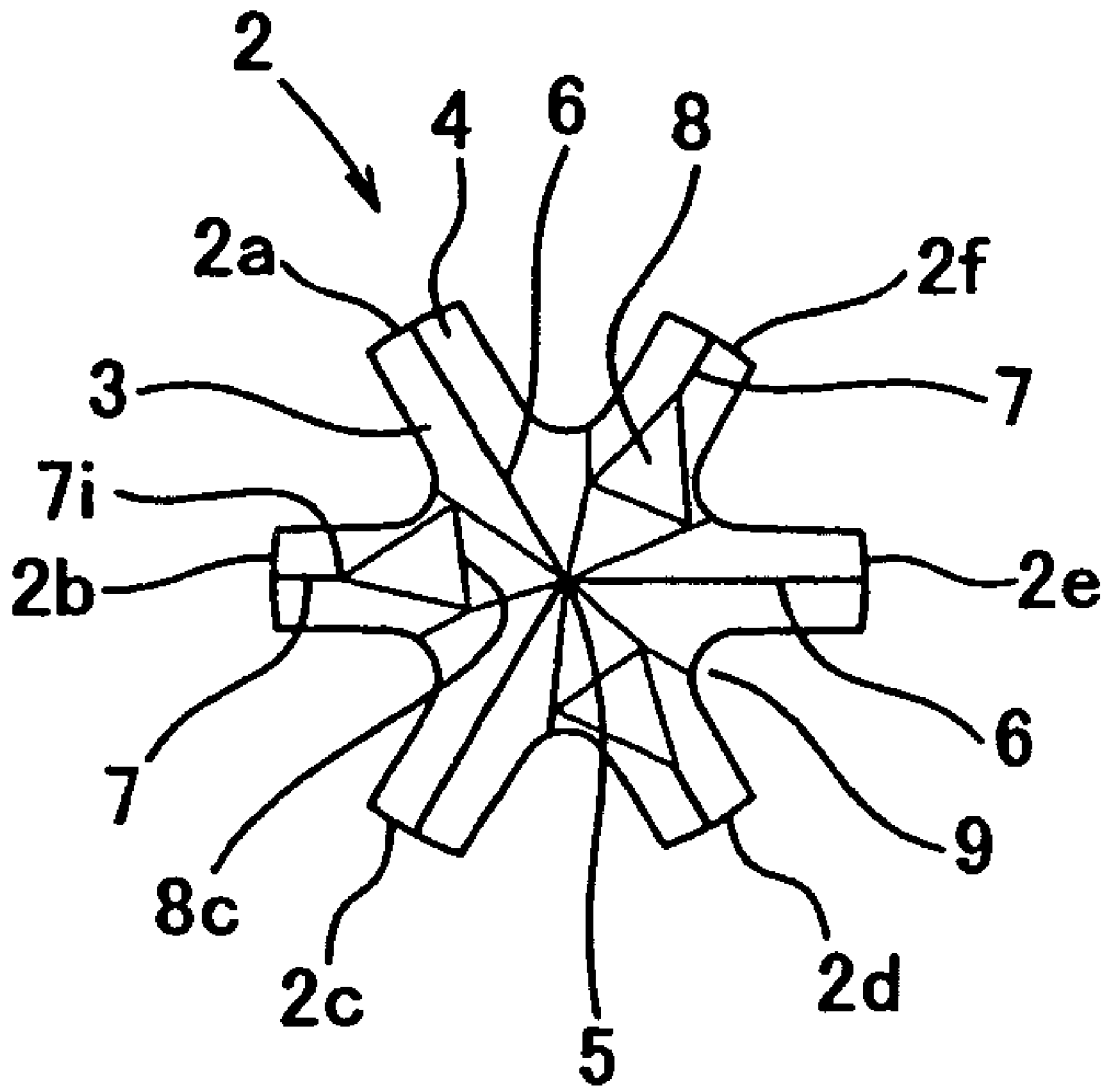
FIG. 2 is a bottom view showing a structure of a lower end face (bottom face: face used for striking and cutting) of a cutting blade body of the drill bit.
Figure 3:
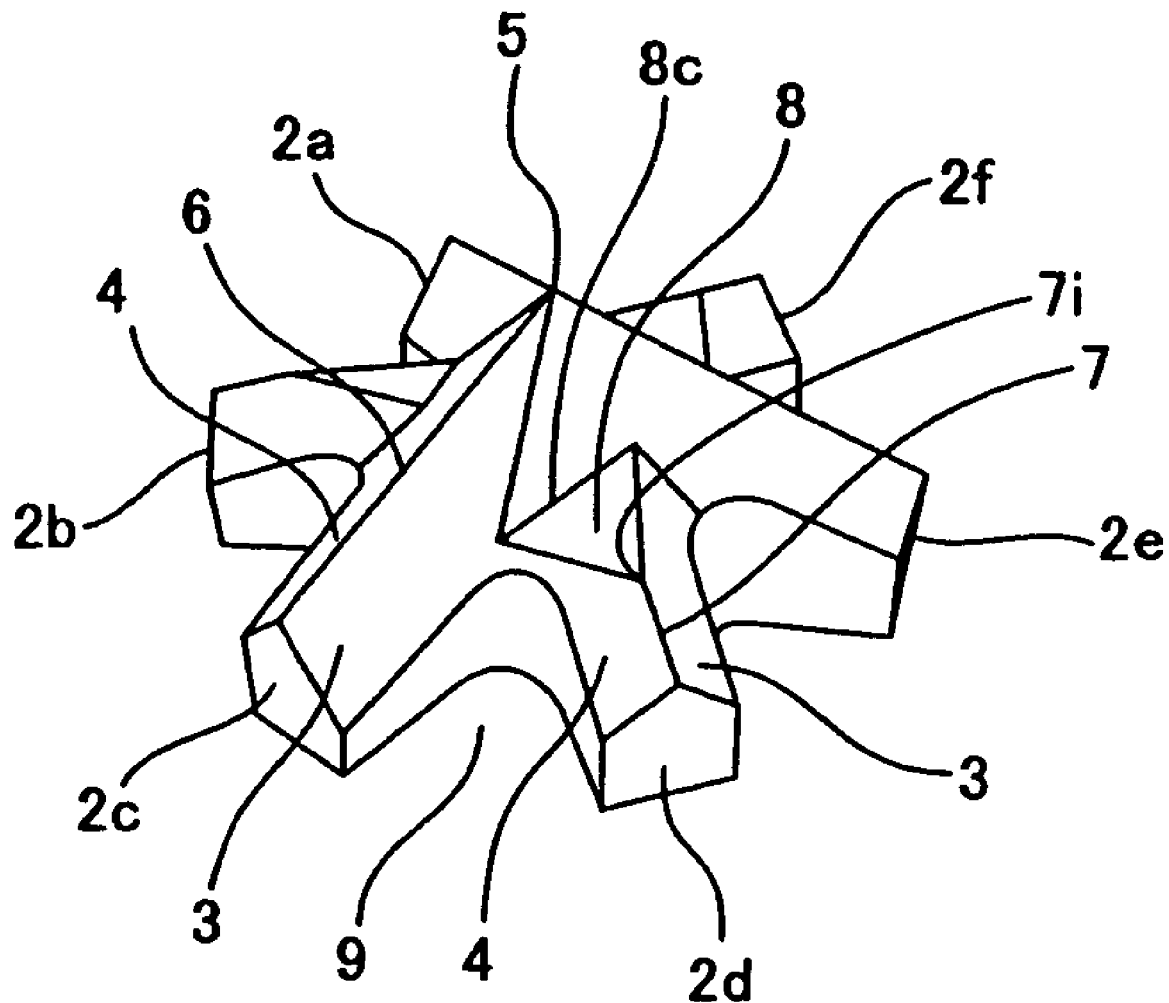
FIG. 3 is a perspective view of the cutting blade body of the drill bit in FIGS. 1 and 2 as seen from a tip end side of the cutting blade body.

As shown in FIG. 1, a block-like cutting blade body 2 made of cemented carbide shown in FIGS. 1 to 3 is integrally and fixedly attached to a tip end of a steel bit body 1 by a known method, for example, welding such as brazing or friction welding with pressure.

In this embodiment, the cutting blade body 2 is provided with six cutting blades 2a, 2b, 2c, 2d, 2e, and 2f configured to extend substantially radially to be equally spaced apart in a circumferential direction of the cutting blade body 2, i.e., at intervals of 60 degrees such that cutting edges extend radially outward from a rotation center (center of rotation) side. Each of the cutting blades 2a, 2b, 2c, 2d, 2e, and 2f has a face 3 located forward and a flank 4 located rearward in rotation of drilling. Each cutting edge is formed by an edge between the face 3 and the flank 4 to extend substantially radially. The edge is configured to protrude (downward in FIG. 1 and upward in FIG. 3) toward a tip end of the cutting blade body 2. In this embodiment, six cutting edges are formed to be equally spaced apart from each other in the circumferential direction so as to correspond to the cutting blades 2a, 2b, 2c, 2d, 2e, and 2f. In this embodiment, therefore, the six cutting edges include three main cutting edges 6 and three sub cutting edges 7 disposed at intervals of 60 degrees.

Figure 4:
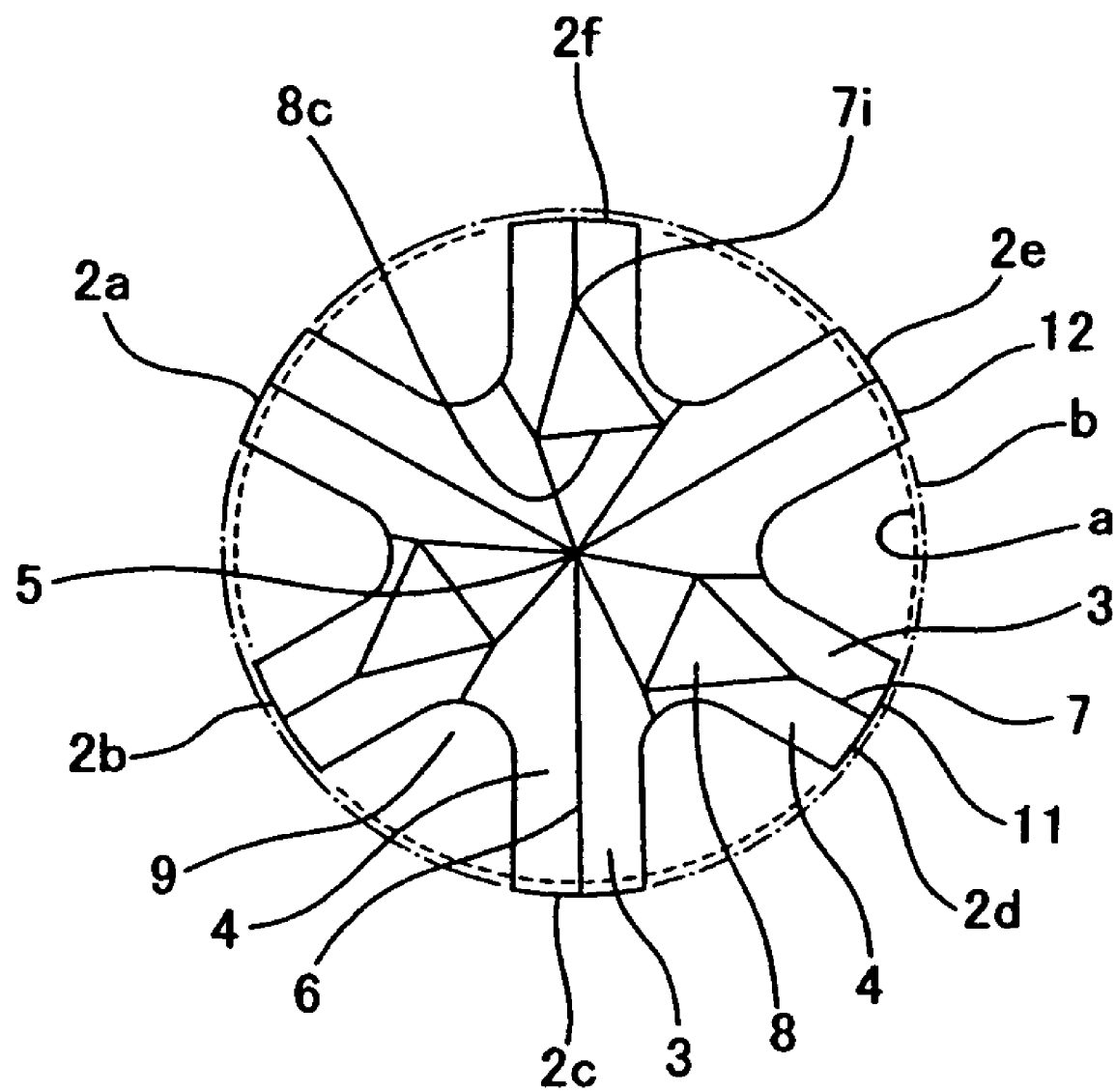
FIG. 4 is an enlarged bottom view of the cutting blade body for explaining a rotation trace of cutting blades of the cutting blade body.

In this embodiment, the cutting edges have two types, i.e., the main cutting edges 6 and the sub cutting edges 7. As shown in FIGS. 2 and 4, the main cutting edge 6 and the sub cutting edge 7 are alternately disposed at the tip end of the cutting blade body 2 as seen from a bottom face of the cutting blade body 2. Also, the cutting blades 2a, 2c, and 2e provided with the main cutting edges 6 are main cutting blades and the cutting blades 2b, 2d, and 2f provided with the sub cutting edges 7 are sub cutting blades. Inner ends of the main cutting edges 6 are located at a tip end 5 which is formed by coupling the inner ends of the main cutting edges 6 and serves as the center of rotation. Outer ends 12 of the main cutting edges 6 are located to be spaced radially outward apart from the center of rotation (tip end 5), to be precise, on an outer periphery (outermost periphery) of a rotation trace of the cutting blade body 2.

Inner ends 7i of the sub cutting edges 7 are located to be spaced radially outward apart from the tip end 5 which is the center of rotation. Crush faces 8 are formed between the tip end 5 and the inner ends 7i of the sub cutting edges 7. While the outer ends 12 of the main cutting edges 6 are located on the outer periphery of the cutting blade body 2, outer ends 11 of the sub cutting edges 7 are located slightly radially inward relative to the outer periphery of the cutting blade body 2. More specifically, the length of the cutting blades 2b, 2d, and 2f having the sub cutting edges 7 at tip ends thereof (length from the inner ends to the outer ends) is shorter than that of the cutting blades 2a, 2c, and 2e having the main cutting edges 6 at tip ends thereof so that a rotation trace a of the outer ends 11 of the cutting blades 2b, 2d, and 2f having the sub cutting edges 7 are located radially inward relative to a rotation trace b of the outer ends 12 of the cutting blades 2a, 2c, and 2e having the main cutting edges 6. More specifically, in the case of a drill bit having an outer diameter in a range of approximately 6 mm to 20 mm, the outer ends 11 of the sub cutting edges 7 are located radially inward relative to the outer ends 12 of the main cutting edges 6 to have an appropriate distance between the outer ends 11 and the outer ends 12 in a range of 0.2 mm to 0.5 mm.

Thus, the sub cutting edges 7 are shorter in length than the main cutting edges 6 since the positions of the inner ends and the positions of the outer ends are different between the sub cutting edges 7 and the main cutting edges 6. Specifically, the sub cutting edges 7 may be about ½ to ¼, particularly, about ⅓ to ¼ as long as the main cutting edges 6. The crush face 8 is located to retreat from the tip end 5 farther than the sub cutting edge 7. In this embodiment, a portion of the crush face 8, which retreats farthest, is located to retreat substantially as far as the outer end 2d of the sub cutting edges 7. A line 8c corresponding to an inner end of the crush face 8 extends in a direction substantially perpendicular to a line connecting the inner end 7i of the sub cutting edge 7 to the center of the drill bit, to be precise, to cross the line at an angle of 85 degrees. Further, the crush face 8 is slightly inclined upward toward the flank 4 forming the sub cutting edge 7. In this embodiment, the crush face 8 is inclined at an angle of about 10 to 15 degrees. And, as seen from the tip end side (see FIGS. 2 and 4), the crush face 8 is triangle shaped, substantially isosceles-triangle shaped (to be precise, deformed isosceles-triangle shaped because the sides cross each other at an angle of 85 degrees rather than 90 degrees).

As shown in FIG. 1, an angle (angle made by the main cutting edge 6 with respect to the center line of the drill bit) a of the main cutting edge 6 is equal to an angle β (angle made by the sub cutting edge 7 with respect to the center line of the drill bit). In addition, as can be clearly shown in FIG. 1, the sub cutting edges 7 are located to retreat from the tip end 5 farther than the main cutting edges 6. The sub cutting edges 7 may retreat relative to the main cutting edges 6 by about 0.2 mm to 1.5 mm in the case of the drill bit having an outer diameter of about 6 mm to 20 mm.

As shown in FIG. 1, as the drill bit is seen from the direction perpendicular to the longitudinal direction, the sub cutting edges 7 are realized by retreating from the tip end 5 farther than the main cutting edges 6 by reducing the thickness (dimension in a width direction) of the cutting blades 2b, 2d, and 2f, that is, the sub cutting edges 7 are parallel-shifted backward from the main cutting edges 6. But, this structure is not to be interpreted as limiting. For example, this structure may be realized by reducing a dimension of the edge between the face 3 and the flank 4.

Concave portions substantially V-shape in cross section are each formed between the cutting blades 2a and 2b, 2b and 2c, 2c and 2d, 2d and 2e, 2e and 2f, and 2f and 2a and serve as chip discharge grooves 9. These chip discharge grooves 9 communicate with bit chip discharge grooves 10 provided on an outer periphery of the bit body 1.

Although not shown, a shank portion may be formed to extend from a base portion of the bit body 1. The shank portion is held by a fixing means such as chuck or the like attached to a drive shaft of a rotating hammer drill. So, this drill bit can be replaced by a known commercially available drill bit during use.

The drill bit constructed as described above of the present invention is attached to the rotating hammer drill and functions as described below in drilling the hole in concrete or the like.

In drilling a hole in the concrete, the stone, etc, cutting of the cutting face of the drill hole is done by the main cutting edges 6 extending from the tip end 5 of the drill bit to the outer ends 12 of the cutting blade body 2. Small chips, which are included in chips caused by cutting by the main cutting edges 6, move up from the cutting face of the drill hole during repeated striking and cutting, and further move through the chip discharge grooves 9 each provided between the cutting blades 2a, and 2b, 2b and 2c, 2c and 2d, 2d and 2e, 2e and 2f, and 2f and 2a. These chips further move into the bit chip discharge grooves 10 and are then smoothly discharged outside the drill hole.

Meanwhile, large chip lumps remaining around the center of the cutting face of the drill hole is crushed by direct striking by the main cutting edge 6 in subsequent striking and cutting, or otherwise enter a region between the main cutting edges 6 and crushed into small chips by the crush face 8 of the sub cutting edge 7. The crushed small chips are pushed into the chip discharge grooves 9 by the inclination of the crush face 8. And, large chip lumps remaining on the cutting face of the drill hole and being pushed toward a vicinity of an inner peripheral wall of the drill hole on the cutting face of the drill hole, are sandwiched between the main cutting edges 6 and crushed by striking by the sub cutting edge 7 during striking and cutting. The crushed chips are pushed out into the chip discharge grooves 9 by the inclination of the cutting faces 8. As should be appreciated, the large chip lumps generated on the cutting face of the drill bit are efficiently crushed by cooperation between the main cutting edges 6 and the sub cutting edges 7. As a consequence, drilling is accomplished with high drilling efficiency.

During drilling, a cutting force is always applied by the cooperation between the main cutting edges 6 and the sub cutting edges 7 which differ in length and placement from each other and differs in distance from the tip end 5. So, the cooperation stably continues without being substantially affected by a great change in a drilling condition due to striking of the cutting edges on the reinforcing steel within the concrete, the stone, etc

INDUSTRIAL APPLICABILITY

In accordance with the drill bit constructed as described above, regardless of a great change in a drilling condition due to striking of a tip end of the drill bit against concrete, stone, etc, drilling can be carried out as stably as possible by lessening the change. In addition, since large chip lumps can be effectively crushed by cooperation between main cutting edges and sub cutting edges without impeding striking and cutting, drilling is carried out without reducing drilling efficiency.

The invention claimed is:

1. A drill bit comprising:

a plurality of cutting blades disposed at a tip end of a drill, each of the cutting blades extending substantially radially outward from a rotation center side of the drill, each of the cutting blades having a cutting edge formed by protruding an edge between a face and a flank of each cutting blade toward a tip end of the drill, and a shaft-shaped bit body attached to a base end side of the cutting blades and having a base end portion coupled to a shank portion, the drill bit being configured to perform striking and cutting by a combination of a rotation and an axial movement, wherein the cutting blades include main cutting blades and sub cutting blades, the main cutting blades including radially oriented main cutting edges, each of the main cutting edges extending radially to an inner end and converging at a rotational and geometric center of the drill bit to form a pointed tip end, each of the main cutting blades having an outer end located on an outer periphery of a rotation trace of the drill bit;

the sub cutting blades including exclusively linear sub cutting edges extending in the radial direction, each of the sub cutting edges having an inner end spaced radially outward apart from the rotational and geometric center and an outer end spaced radially inward from the outer periphery of the rotation trace, and a planar crush face formed between the inner end of each sub cutting edge and the rotational and geometric center to retreat from the sub cutting edge such that the crush face is inclined downward on the flank side of the sub cutting blade, an outer extent of each crush face terminating at the inner end of the adjacent sub cutting blade.

2. The drill bit of claim 1 wherein each crush face is a triangle.

* * * * *